United States Patent
Schmidt

[11] 3,720,912
[45] March 13, 1973

[54] METHODS FOR INVESTIGATING EARTH FORMATIONS

[75] Inventor: Arthur W. Schmidt, Houston, Tex.

[73] Assignee: Schlumberger Technology Corporation, New York, N.Y.

[22] Filed: Dec. 11, 1969

[21] Appl. No.: 884,100

[52] U.S. Cl. .......................340/15.5 BH, 340/15.5 TI, 340/15.5 OS, 340/18 P, 250/83.6 W
[51] Int. Cl. ..............................................G01v 1/22
[58] Field of Search..340/15.5 BH, 15.5 TI, 15.5 OS, 340/18 P; 250/83.6 W; 73/152

[56] References Cited

UNITED STATES PATENTS

| 3,311,876 | 3/1967 | Lee | 250/83.6 W |
| 3,508,438 | 4/1970 | Alger et al. | 250/83.6 W |
| 3,508,439 | 4/1970 | Alger | 250/83.6 W |

OTHER PUBLICATIONS

Tixier & Alger, "Log Evaluation of Non–Metallic Mineral Deposits," June 11, 1967, pg. 1–22, SPWLA Trans.
F. Lebreton, Log–Combining Refues Porosity Measurement, Dec. 1963, Pg. 116–128, Petroleum Engineer.

Primary Examiner—Benjamin A. Borchelt
Assistant Examiner—N. Moskowitz
Attorney—Stewart F. Moore, Jerry M. Presson, Edward M. Roney, William R. Sherman, James C. Kesterson, Michael J. Berger, David L. Moseley and Ernest R. Archambeau

[57] ABSTRACT

In accordance with illustrative embodiments of the present invention, measurements of the acoustic travel time, bulk density and hydrogen content of a formation are obtained over a section of a borehole and used to compute parameters relating to coal deposits and to the strength or competence of formations. These measurements are first combined in a 4 × 4 matrix to enable the detection of the presence of an appreciable coal deposit. Once such a deposit is discovered, the travel time and bulk density measurements are combined in a 3 × 3 matrix to provide computed parameters relating to the quality of coal in such a deposit. Additionally, the travel time and density measurements are used to determine the strength or competence of the coal bearing bed as well as adjacent earth formation beds to enable evaluation relating to the construction of a mine.

9 Claims, 4 Drawing Figures

METHODS FOR INVESTIGATING EARTH FORMATIONS

This invention relates to methods for investigating the earth formations traversed by a borehole, and more particularly to the processing of well logging data derived from apparatus lowered into a borehole for investigating subsurface earth formations.

In seeking to determine the nature of subsurface earth formations adjacent a borehole drilled into the earth, various types of exploring devices may be lowered into the borehole for measuring various properties of these formations. The three principal types of such exploring devices are electrical exploring devices (using either electrodes or induction coils), sonic exploring devices, and radioactivity exploring devices (gamma ray, neutron, etc.).

The electrical exploring devices measure the electrical resistivities (or conductivities) of the earth formations. These electrical resistivities are determined primarily by the amount, distribution, and resistivity of the fluids contained in the formation pore spaces. The sonic exploring devices, on the other hand, measure the time required for acoustic waves to travel across a given span of the earth formations. This sonic travel time is determined primarily by the nature of the rock structure and particularly its porosity. Radioactivity exploring devices measure either the natural radioactivity of the formations or the radioactivity induced therein by bombardment of the formations with radioactive particles or rays.

Two particular radioactivity exploring devices used to investigate formations are the formation density logging tool and the neutron logging tool. The formation density logging tool emits gamma rays which are diffused through the formation and the number of these diffused gamma rays counted to provide a measure of electron density of the adjacent formation. Moreover, it is known that this electron density is very closely proportional to the bulk density of the formation in substantially all cases. (For cases where this proportionality does not apply, appropriate corrections can be made.)

The neutron tool, on the other hand, utilizes a source for emitting neutrons into the adjacent formations. In one form of neutron device, the neutrons lose energy by collision with atoms in the formations. When the energy level of these neutrons is reduced to the epithermal energy range, they can be detected by a nearby detector of epithermal neutrons. Since hydrogen atoms are the only ones whose weights are almost equal to that of a neutron, they are the most effective in reducing the energy level of the neutrons to enable their capture. Thus, it can be said that this type of neutron log is essentially a record of the hydrogen atom density of rocks surrounding a borehole. Since the formation pore spaces are generally filled with either water or hydrocarbons which both have about the same amount of hydrogen, the neutron log does not distinguish between oil and water, but is primarily affected by the formation porosity. By combining the measurements derived from the formation density log, the sonic log, and the neutron log, measurements of the porosity and lithology of the formation can be obtained. (For example, see U.S. Pat. No. 3,590,228, issued June 29, 1971, to J. A. Burke, or copending application Ser. No. 841,527, filed by D. H. Tinch et al. on July 14, 1969.

In addition to using well logging measurements to aid in determining the location, nature and extent of hydrocarbons in the subsurface formations, it would also be desirable to use such well logging measurements as an aid in detecting the location, nature and extent of coal deposits in subsurface formations.

It is, therefore, an object of the present invention to provide new and improved methods of processing well logging data derived from subsurface earth formation investigating devices to obtain information relating to coal deposits.

In addition to obtaining information concerning the location, nature and extent of such coal deposits, it would also be desirable to obtain information relating to the strength characteristics of the formation. By obtaining such information, it is possible to ascertain the feasibility of setting up mining operations to extract the coal.

It is, therefore, another object of the present invention to provide new and improved methods for processing well logging data to determine the strength characteristics of subsurface earth formations.

In accordance with the present invention, a method of investigating earth formations adjoining a borehole comprises deriving measurements of the acoustic travel time and bulk density of a formation over a section of a borehole. These derived measurements can be combined to obtain representations of parameters relating to coal deposits in said formation. For example, these measurements can be combined to give logs representative of the quality of coal bearing formations or, they can be combined in a manner to give information relating to the strength or competence of formations. Moreover, by measuring the hydrogen content of the formations in addition to the acoustic travel time and bulk density, and combining these three measurements in a given manner, a lithology log can be produced from which coal deposits can be readily identified.

For a better understanding of the present invention, together with other and further objects thereof, reference is had to the following description taken in connection with the accompanying drawings, the scope of the invention being pointed out in the appended claims.

Referring to the drawings:

FIG. 1A shows a portion of the signal processing apparatus of FIG. 1 in greater detail;

Figure 1:
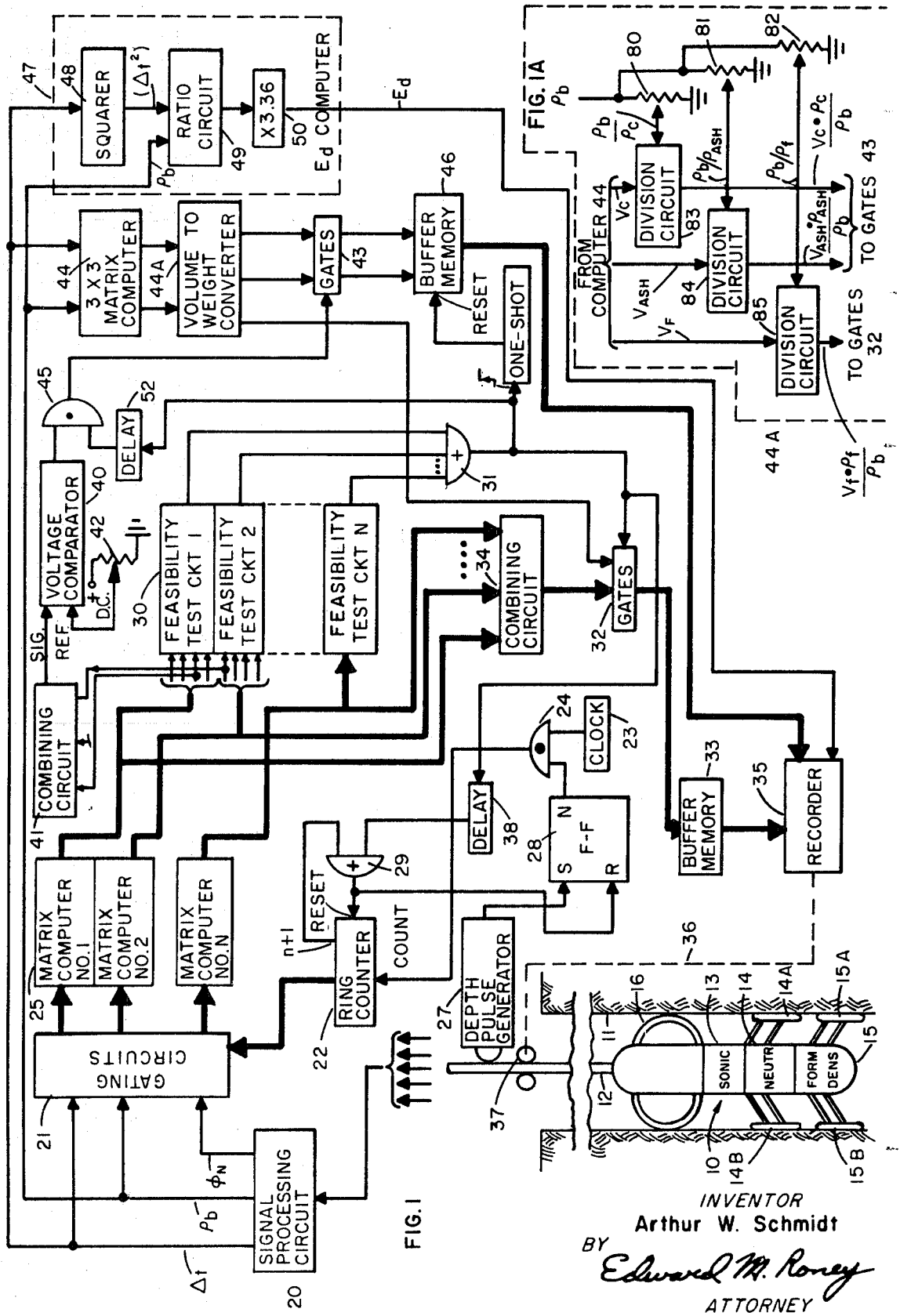
FIG. 1 shows an investigating device in a borehole along with a schematic representation of apparatus for processing signals derived from such an investigating device.

Now, referring to FIG. 1, there is shown an investigating apparatus 10 located in a borehole 11 on the end of an armored multiconductor 12 which is raised and lowered in a borehole by a suitable drum and winch mechanism (not shown). The investigating apparatus 10 includes a suitable sonic exploring device 13 for measuring the acoustic travel time of the formations. Sonic exploring devices of this type can be found in U.S. Pat. No. 3,231,041 granted to F. P. Kokesh on Jan. 25, 1966. The investigating apparatus 10 also includes a sidewall epithermal neutron exploring device 14, having a source in a skid 14a, for measuring the hydrogen content of the adjoining formations, and thus the porosity of the adjoining formations. Exploring devices of this type can be found in U.S. Pat. No. 2,769,918 granted to C. W. Tittle on Nov. 6, 1956.

If desired, a conventional neutron exploring device can be utilized in place of the sidewall epithermal neutron device. In such a conventional neutron tool, neutrons emitted into a formation are captured by certain types of atoms in the formation which results in the emission of very high energy level gamma rays, called capture gamma rays. These capture gamma rays are counted by a nearby detector. This type of neutron tool is also primarily responsive to the hydrogen content of the formation.

The investigating apparatus 10 also includes a formation density exploring device 15 for producing well logging measurements which can be utilized to calculate the bulk density of the adjoining formations. In this regard, a skid 15a houses a source and two detectors spaced different distances from the source. This arrangement of source and detectors produces signals which correspond to the bulk density of the earth formations. The theory, construction and operation of the formation density measuring device 15 are described more completely in an article entitled, "Dual Formation Spacing Density Log," by J. S. Wahl, J. Tittman, C. W. Johnstone and R. P. Alger, Journal of Petroleum Technology, Dec. 1964, pages 1411–1416, and U.S. Pat. No. 3,321,625, granted on May 23, 1967 to John S. Wahl, and assigned to the same assignee as the invention described herein.

To keep the investigating apparatus 10 centered in the borehole, a pair of extendable borehole well engaging pad members 14b and 15b are provided opposite the pad members 14a and 15a. To keep the upper portion of the investigating apparatus 10 centered, a plurality of spacers 16 are provided. A borehole caliper also is combined with the arms which extend the skids 15a and 15b, which caliper supplies a signal representative of borehole diameter to the surface of the earth. This caliper signal can be utilized in conjunction with the signals from the two detectors of the formation density tool to produce measurements of the formation bulk density.

The formation signals derived from the investigating apparatus 10 are supplied to a signal processing circuit 20 which operates, among other things, to prepare the signals for processing by other circuits. The circuit 20 also computes the formation bulk density $\rho_b$ from the signals derived from the formation density tool 15, a value of porosity derived from the signals produced by the neutron exploring device 14, designated $\phi_N$, and the travel time $\Delta t$ for acoustic energy to travel over a given formation span. The quantity $\phi_N$ represents the formation hydrogen content which, as explained earlier, is roughly the same thing as the formation porosity for most situations. Each of these measurements $\Delta t$, $\rho_b$ and $\phi_N$ is made up of the contribution of all of the parameters present in the formation under investigation. That is to say, the measurements $\Delta t$, $\rho_b$, $\phi_N$ are each influenced to some degree by each mineral, fluid or gas in the formation. Knowing the response of each exploring device (sonic, formation density and neutron) to each such formation parameter, the following expressions can be written:

$$\Delta t = \Delta t_f V_f + \Delta t_1 V_1 + \Delta t_2 V_2 + \Delta t_3 V_3 \tag{1}$$

$$\rho_b = \rho_f V_f + \rho_1 V_1 + \rho_2 V_2 + \rho_3 V_3 \tag{2}$$

$$\phi_N = \phi_{Nf} V_f + \phi_{N1} V_1 + \phi_{N2} V_2 + \phi_{N3} V_3 \tag{3}$$

where $V_f$ is the percentage of the total bulk volume of formation containing fluid and $V_1$, $V_2$ and $V_3$ are the percentages of total bulk volume of parameters 1, 2, 3, where parameters 1, 2 and 3 can be any formation parameters such as various minerals, gas, etc., and $\Delta t_f$ and $\Delta t_1$, $\rho_2$, etc., represent the characteristic travel time, bulk density, of the particular parameter indicated by the subscript.

Since the total of all formation parameters must equal 1 or 100 percent, an identity equation can be written:

$$1 = V_f + V_1 + V_2 + V_3 \tag{4}$$

Equations 1 through 4 represent a 4 × 4 matrix which can be solved by appropriate means to determine the bulk volume percentages of each of the formation parameters, i.e., solutions to $V_f$, $V_1$, $V_2$, and $V_3$ can be obtained. However, for the solution of this 4 × 4 matrix to be correct, it is necessary that the parameters which are present in the formation be accurately selected. The apparatus of FIG. 1 operates to select a set of formation parameters which gives the most feasible results and record these feasible results to produce a log of the bulk volume percentages of the selected formation parameters. To accomplish this, the formation parameters are arranged in sets of four parameters (e.g., three minerals plus fluid volume). These sets are then ordered in accordance with the probability of occurrence of each set of parameters. The system then proceeds to compute the bulk volume percentages of the parameters of the most probable set and check the feasibility of the results. If the results are feasible, these results using the most probable matrix set are recorded. On the other hand, if the results are not feasible, the apparatus proceeds to select the next most probable set of parameters, compute the bulk volume percentages of each parameter, and check the results for feasibility. If feasible, the results are recorded and if not feasible, the system proceeds to a third set, then a fourth set, etc., until a set of parameters which gives feasible answers is finally selected.

Thus, the highest order set of parameters which gives feasible results is selected for recording at each depth level. If no feasible results are obtained at any given depth level, the results obtained at the last depth level which gave feasible answers are selected for recording at the depth level presently under consideration.

Now turning to FIG. 1 to see how this operation is accomplished, the $\Delta t$, $\rho_b$ and $\phi_N$ signals from signal processing circuit 20 are applied to a plurality of gating circuits, designated 21. Gating circuits 21 comprise a plurality of sets of three gating circuits each, with each set of gating circuits being energized by a separate signal from a counter 22. At each depth level, an AND gate 24 is enabled to pass clock pulses from a clock source 23 to the count input of the counter 22 so as to energize each set of gating circuits in sequence. Upon energization of the first set of gating circuits, the $\Delta t$, $\rho_b$, and $\phi_N$ signals are applied to a matrix computer No. 1 which is one of a plurality of matrix computers 25. During the next time interval, counter 22 generates a signal which causes a second set of gating circuits to be energized to supply the $\Delta t$, $\rho_b$, and $V_n$ signals to a matrix computer No. 2. Counter 22 continues this operation until the last or $n^{th}$ set of gating circuits has been energized.

To control the gating operation, the counter 22 is made to cycle through a sequence of operation at given depth intervals throughout the borehole. To accomplish this, a depth pulse generator 27 is responsive to incremental movements of the cable 12 for generating depth pulses representative of such incremental movements. Each depth pulse sets a flip-flop 28 which in turn enables the AND gate 24 to pass the clock pulses from clock 23 to the counter 22. Once the counter 22 has cycled through a sequence, i.e., as counted $n$ pulses, the $n + 1$ pulse resets the counter 22 and the flip-flop 28 via an OR gate 29.

The computed results from each one of the matrix computers 25 are tested for feasibility by individual ones of a plurality of feasibility test circuits 30 which are individually designated as feasibility test circuit 1, feasibility test circuit 2, etc., to correspond with the numerical designations of the matrix computers 25. Each one of these feasibility test circuits checks the four output signals from a corresponding matrix computer for feasibility and generates an output signal if the results are feasible. The particular test that each feasibility test circuit performs depends upon a number of factors, including the particular parameters which make up the corresponding matrix set, the order of the matrix sets, the geographical region of the borehole which is being logged, etc. In other words, the particular feasibility test to be performed on the computed results of each matrix set depends on factors which are supplied by log analysts familiar with the geographical region of the well being logged.

The output leads from each of the feasibility test circuits are combined in an OR gate 31 whose output lead is connected to the reset inputs of the counter 22 and flip-flop 28 and the control terminal of a plurality of parallel gate circuits 32. Thus, upon feasible results being obtained from any of the matrix computers 25, the counter 22 and flip-flop 28 are reset and the gates 32 are energized to pass the output signals from the matrix computer which has just provided feasible answers. These output signals are passed to a buffer memory 33 by way of a combining circuit 34 and the gates 32. The buffer memory 33 stores the signals from the selected matrix computer 25 for application to a recorder 35 whose record medium is driven as a function of borehole depth by a rotating shaft 36 connected to a rotating wheel 37 which engages the cable 12.

Since only one matrix computer at a time can produce output signals, the combining circuit 34 can take the form of four busses which connect the corresponding output leads from each matrix computer together. Thus, the No. 1 output conductor from each matrix computer could be connected together, and the No. 2 connected together, etc. If the output circuits of the various matrix computers must be isolated from one another, the combining circuit 34 could also perform this function. The buffer memory 33 could take the form of a plurality of capacitors, each connected to the input of a high input impedance buffer amplifier for application to the recorder 35. By this arrangement, the buffer memory 33 would always supply signals to the recorder 35 corresponding to the signals received from combining circuit 34 the last time the gating circuits 32 were energized.

Summarizing that portion of the FIG. 1 apparatus described thus far, each time the investigating apparatus 10 moves a given incremental distance through the borehole 11, the depth pulse generator 27 sets the flip-flop 28 to enable the counter 22 to begin counting the clock pulses from the clock 23. Each clock pulse applied to the counter 22 advances its count by one. Each time the counter 22 advances, a different set of gating circuits within the gating circuits 21 is energized so as to pass the well logging measurements $\Delta t$, $\rho_b$ and $\phi_N$ from signal processing circuit 20 to a selected one of the matrix computers 25. Thus, the first pulse applied to counter 22 will cause the three well logging measurements to be applied to matrix computer No. 1, the second pulse activates matrix computer No. 2, etc.

During the first sequence of this operation, the matrix computer No. 1 computes the four formation parameters given by matrix set No. 1. These computed results are tested for feasibility by the feasibility test circuit No. 1. If the results are feasible, the test circuit No. 1 generates an output signal which connects the output signals from matrix computer No. 1 to the buffer memory 33 for recording and subsequently resets the counter 22 and flip-flop 28, after a suitable delay provided by the delay circuit 38 to allow time for computations to be stored by the buffer memory 33 before the system is reset. The resetting of counter 22 and flip-flop 28 prevents the application of the well logging measurements to any more matrix computers.

If, on the other hand, the results given by matrix computer No. 1 had not been feasible, the feasibility test circuit No. 1 would not have generated a signal and the system would have proceeded to consider the second most probable matrix set by supplying the three well logging measurements to matrix computer No. 2. The feasibility test circuit No. 2 would then check the feasibility of the computed results given by matrix computer No. 2 and if the results were feasible, the answers given by matrix computer No. 2 would be outputed to the memory 33 and the system would shut down until the next depth level is to be considered. If the results had been non-feasible, the system would have proceeded to the third most probable matrix set. This operation continues over and over again until feasible answers are obtained. If, after the system has considered all of the matrix sets, no feasible answers have been obtained, the $n + 1^{th}$ output of the counter 22 resets the system in readiness for the next depth pulse. In this event, the results derived from the last depth level, which are still stored in buffer memory 33, are re-used (or, if the last depth level also did not produce feasible results, the last depth level which did produce feasible results would still be stored in buffer memory 33 and applied to the recorder 35).

Once the system has found an appreciable amount of coal, it would be desirable to determine the quality of that coal. By so doing, information will be available to help the mining engineer determine whether it is economically worthwhile to set up mining operations to remove the coal. It is known that coal consists primarily of carbon, ash and moisture and that the greater the percentage of carbon, the better is the quality of the coal. To determine the relative amount of each of these three parameters in a coal bearing formation, in accordance with an important feature of the present invention, it has been found that the acoustic travel time and bulk density measurements, $\Delta t$ and $\rho_b$, can be combined in a manner to give this information. To this end, the percentages of each of these three parameters are solved for from simultaneous equations using the sonic travel time and bulk density measurements as follows:

$$\Delta t = \Delta t_f V_f + \Delta t_{ash} V_{ash} + \Delta t_{carbon} V_{carbon} \quad (5)$$

$$\rho_b = \rho_f V_f + \rho_{ash} V_{ash} + \rho_{carbon} V_{carbon} \quad (6)$$

A third equation can be written based on the fact that these three constituents should equal 100 percent in a coal bearing formation. Thus:

$$1 = V_f + V_{ash} + V_{carbon} \quad (7)$$

Turning now to FIG. 1 to see how these coal quality computations are made in the FIG. 1 system, the $\Delta t$ and $\rho_b$ measurements from the signal processing circuit 20 are applied to a 3 × 3 matrix computer 44 which is constructed to solve the simultaneous Equations (5), (6) and (7) and produce output signals proportional to the bulk volume amounts of fluid, ash and carbon. These three output quantities from computer 44 are applied to a volume to weight converter 44a which operates to convert the percent by volume measurements to percent by weight measurements. To accomplish this, the converter 44a solves the expressions $$(V_f \rho_f / \rho_b), (V_{ash} \rho_{ash} / \rho_b), \text{ and } (V_c \rho_c / \rho_b)$$

to give the percent by weight of fluid, ash and carbon respectively. The percent by weight fluid measurement is applied to the gates 32 for application to the buffer memory 33 and recorder 35.

Those output conductors from the matrix computers 25 which give the bulk volume of coal are applied to a voltage comparator 40 by way of a combining circuit 41. A potentiometer 42 supplies the reference voltage to the reference input of comparator 40 such that when the signal voltage of combining circuit 41 exceeds this reference voltage, the voltage comparator 40 will generate an output signal which is utilized to enable two parallel gate circuits 43 whenever an AND gate 45 is enabled by the output of OR gate 31 via a delay circuit 52. When the gate circuits 43 are enabled, the percent by weight measurements for ash and carbon are applied to a buffer memory 46 which, like the buffer memory 33, stores the computations for application to the recorder 35 for recording as a function of borehole depth. The buffer memory is reset just prior to the operation of matrix computer 44 during any sequence in which feasible results are obtained. This is accomplished by the leading edge of each output signal from OR gate 31 triggering a one-shot 51 to generate a short time duration pulse. This output pulse, which has a time duration slightly less than the time duration of delay circuit 52, resets the buffer memory 46. By so doing, the buffer memory 46 will be reset before any new computations are applied to it.

Referring to FIG. 1A, there is shown the volume to weight converter 44a in greater detail. The $\rho_b$ measurement is applied to three potentiometers 80, 81, and 82 which divide $\rho_b$ by the predetermined constants $\rho_c$, $\rho_{ash}$, and $\rho_f$ respectively. The signals on the wiper arms of potentiometers 80, 81, and 82 are proportional to $\rho_b/\rho_c$, $\rho_b/\rho_{ash}$, and $\rho_b/\rho_f$ respectively, and are applied to three division circuits 83, 84, and 85 respectively to which are also applied the bulk volume measurements $V_c$, $V_{ash}$, and $V_f$ respectively. The output signals from division circuits 83, 84, and 85 are proportional to $V_c \rho_c / \rho_b$, $V_{ash} \rho_{ash} / \rho_b$, and $V_f \rho_f / \rho_b$ respectively, and are applied to gates 43 and 32, as discussed earlier.

Concerning the operation of this coal quality circuitry, whenever one of the matrix computers 25 which includes coal as one of its matrix parameters is activated, the comparator 40 determines if the amount of coal exceeds the reference voltage from potentiometer 42. (The voltage of each output signal from the matrix computer 25 is proportional to bulk volume percentage of each corresponding parameter.) If the amount of coal exceeds the threshold level and if the particular matrix computer produced feasible results, then the gates 43 are enabled after a delay provided by delay circuit 52 to pass the percent by weight ash and carbon measurements from the 3 × 3 matrix computer 44 to the buffer memory 46 and recorder 35. Prior to energizing the gates 43, the buffer memory 46 is reset, but only if feasible results (with or without coal) have been computed. By this arrangement, the coal quality computations will be made only in formations having an appreciable quantity of coal. If no feasible results can be obtained from any of the matrix computers, then the buffer memory 46 will not be reset and the coal quality computations obtained from the last depth level which gave feasible results will be used instead. If desired, the bulk volumes percentages of fluid, ash and carbon could have been recorded instead of the percent weights thereof.

Now that the mining engineer has information which will tell him how much coal is present in a given formation and the quality of that coal, he must determine whether it is feasible to set up mining operations to extract this coal. One necessary factor in determining this is the strength or competence of the coal bearing formation as well as the strength or competence of those formations situated thereabove. In this connection, in accordance with an important feature of the invention it has been discovered that well logging measurements derived from the sonic logging tool 13 and formation density tool 15 can be utilized to give a measure of the strength characteristic of the formations. The acoustic travel time measurement $\Delta t$ and bulk density measurement $\rho_b$ can be combined to obtain a measure of the dynamic elastic modulus of the formation $E_D$ in the following manner $$E_D = [\rho_b/(\Delta t)^2] \times 3.36 \times 10^9 \text{PSI} \quad (8)$$

Returning to FIG. 1, the $\Delta t$ and $\rho_b$ well logging measurements from signal processing circuit 20 are applied to a computer 47 which utilizes these two well logging measurements to compute the dynamic elastic modulus of the formation $E_D$ in accordance with Equation (8). To accomplish this, within computer 47, the $\Delta t$ measurement is squared by a squaring circuit 48, and $\Delta t^2$ and $\rho_b$ are both applied to a ratio circuit 49 which operates to divide $\Delta t^2$ into $\rho_b$. This output signal from ratio circuit 49 is multiplied by the constant 3.36 in a suitable circuit 50 to produce the desired output signal $E_D$. The signal $E_D$ is then recorded by the recorder 35 as a function of borehole depth.

Since the sonic and formation density exploring devices respond to relatively large formation regions to give average measurements, the microscopic irregularities not detected in such average samples could alter the validity of any conclusion based on the computed value of $E_D$. In other words, a competent appearing formation could be fractured enough to weaken the rock structurally but not enough to create an observed effect on the logs. On the other hand, formations appearing weak because of low values of $E_D$ cannot be considered stronger than calculated values of $E_D$. Therefore, $E_D$ should be considered as an indication of the upper limit of formation competence.

Figure 2:
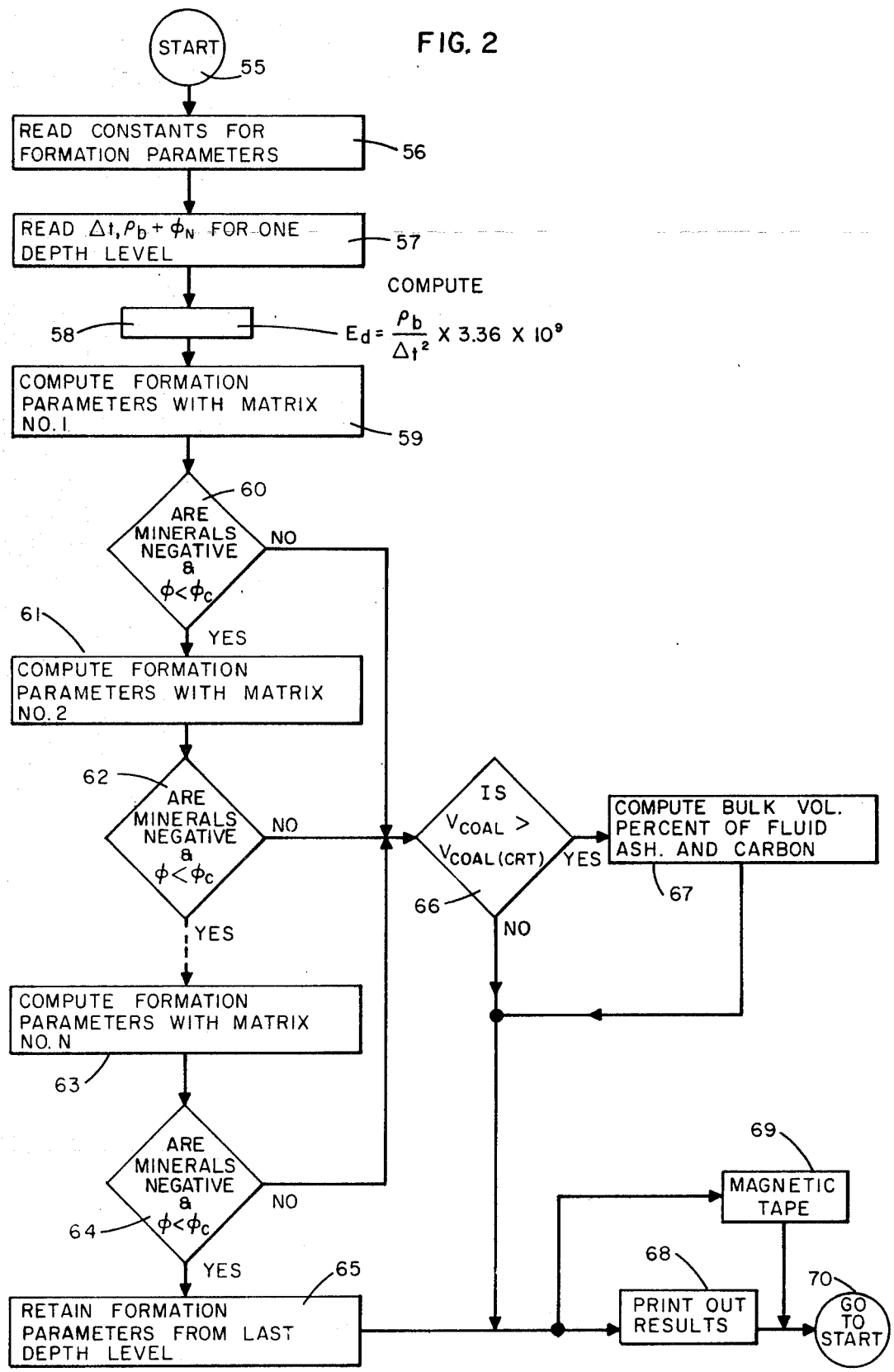
FIG. 2 illustrates another technique for practicing the present invention.

In addition to performing the method of the present invention with the special purpose apparatus of FIG. 1, it would also be possible to program a general purpose digital computer to perform this method. Referring to FIG. 2, there is shown a flow diagram of a computer program which will perform the method of the present invention. In FIG. 2, after the program start represented by the elipse 55, the program instructs the computer to read the constant for the formation parameters, as designated by the block 56. These constants are the constants given by Equations (1) through (7), i.e., $\Delta t_f$, $\rho_1$, $\phi_{N3}$, $\Delta t_{ash}$, etc. These constants can be obtained by inspecting the well logging measurements in various types of formations where the response of the various exploring devices can be easily established, e.g., in water sands. Sometimes they will be known for a given region by geologists familiar with that region.

Next, the program instructs the computer to read the well logging measurements $\Delta t$, $\rho_b$ and $\phi_N$ for one depth level as represented by the box 57. A previous pass through the computer may have been necessary to depth correlate these three well logging measurements if derived from separate investigating devices on separate runs through the borehole, and to determine accurate values of $\Delta t$, $\rho_b$, and $\phi_N$. Next, as represented by the block 58, the dynamic elastic modulus of the formation $E_D$ is computed from Equation (8).

The next portion of the program represents the selection of a matrix set which gives feasible computations of the formation parameters. To this end, the formation parameters given by the most probable matrix set are computed, as represented by the block 59. Then, as represented by the decision element 60, the computations given by matrix set 1 are tested for feasibility. In this example, this feasibility test takes the form of determining if the minerals $V_1$, $V_2$, and $V_3$ are negative and if the computed value of porosity, i.e., $V_f$ is less than a given critical value of porosity. This critical value represents a value of porosity for which it can be assumed that the actual formation porosity will never be less than. If the answers to the questions asked by the decision element 60 are yes, i.e., the feasibility test has been failed, then the bulk volume percentages of the second most probable set of formation parameters given by matrix set No. 2 are computed as represented by the block 61. These computations are checked for feasibility as represented by the decision element 62. If this feasibility test is failed, the formation parameters of the third most probable set are used, then the fourth, fifth, and so on, until the $n^{th}$ or last most probable set of parameters are selected. If the computations resulting from this $n^{th}$ matrix set are still not feasible (refer to elements 63 and 64), then the formation parameters computed from the last depth level are retained, as represented by the block 65. Of course if no feasible results were obtained at the last depth level, the computed formation parameters from the next preceding step level were retained, or, if not, from the one before that, etc.

On the other hand, if feasible results were obtained using one of the given sets of formation parameters, the first matrix set which gave feasible answers, i.e., the lowest order or most probable set, is used to provide bulk volume percentage computations of the selected formation parameters. Once feasible results are obtained, the program proceeds on to the coal quality portion of the program. Thus, if the answer given by one of the decision blocks 60, 62, etc., was no, the program instructs the computer to determine if the bulk volume of coal computed from the first portion of the program is greater than a critical or cut-off value, i.e., $V_{coal} > V_{coal\ (CRT)}$, as represented by the decision element 66. If the answer is yes, the bulk volume percentage of fluid, ash and carbon, i.e., $V_f$, $V_{ash}$, and $V_{carbon}$ are computed, as represented by the block 67. These results are either printed out or written on magnetic tape, as represented by the elements 68 and 69.

Regarding the outputing of data, the bulk volume percentages of the four formation parameters given by Equations (1) through (4) are printed out as one set of data, the bulk volume percentage of fluid, ash and carbon given by Equations (5) through (7) are printed out as a second set of data, and the dynamic elastic modulus of the formation $E_D$ is outputed as a third piece of data. If the amount of coal is less than the critical value, the coal quality computation step 67 is by-passed and only the four formation parameters and the elastic modulus of the formation $E_D$ are outputed. If no feasible formation parameters were obtained, the formation parameters from the last depth level are outputed as represented by the block 65. After the results are outputed, the program returns to start as represented by the circle 70 and the next depth level is considered. While this program gave the bulk volume percentages of fluid, ash and carbon, it would have been possible to compute the percent by weight of these three parameters as was done with the FIG. 1 system.

Figure 3:
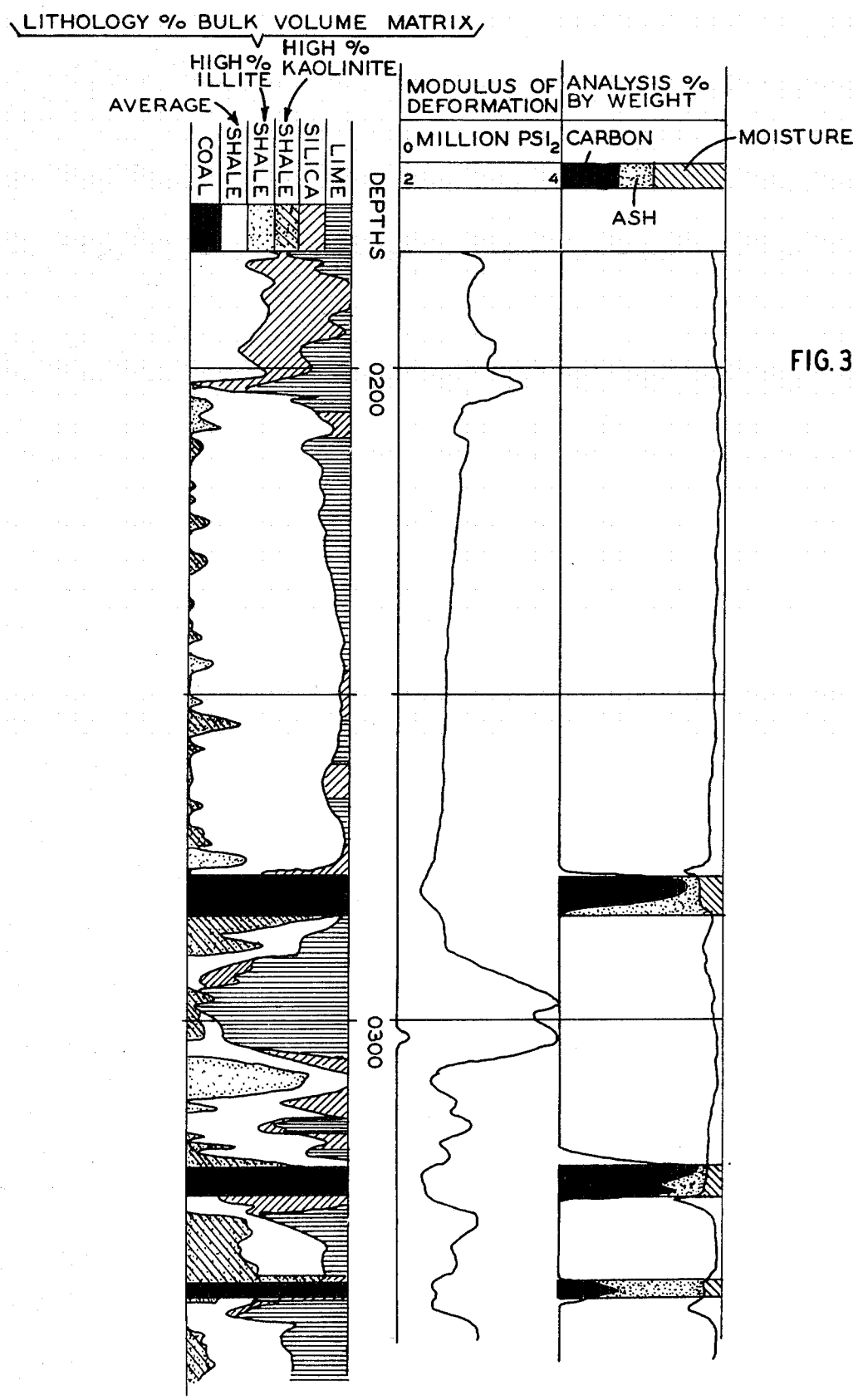
FIG. 3 shows examples of the logs which could be obtained through the practice of the present invention.

Turning now to FIG. 3, there is shown a typical example of logs produced when practicing the method of the present invention. The lefthand track in FIG. 3 is a log of lithology as given by the solution of Equations (1) through (4). The various formation parameters are designated by the legend at the top of this lefthand track with the dark areas representing coal. It will be noted that porosity or fluid content is omitted from the lefthand recording track of FIG. 3. This is possible since the fluid content is recorded in the coal quality portion of the log. This is an optional but desirable feature and can be readily accomplished by suitable means. In this FIG. 3 example, it can be seen that there is a thin coal bed located at approximately 235 feet, a second coal bed of greater thickness extending from approximately 290 feet to 300 feet, and a third coal bed at approximately 350 feet.

The righthand track of the FIG. 3 log gives the quality of the coal. The interval between the righthand edge of the log and the first curve gives the water or moisture content by weight. The interval between this first curve and the second curve gives the percent by weight of ash and the interval between this second curve and the lefthand side of the track gives the percent by weight of carbon. The fluid content is recorded continuously and the ash and carbon content by weight are recorded only in coal bearing formations. It can be seen from FIG. 3 that opposite each coal bearing formation, the carbon content becomes substantial.

The middle track in FIG. 3 is the strength index log which corresponds to the recorded dynamic modulus of the formation $E_D$. $E_D$ is also continuously recorded since the strength characteristics of beds adjoining a coal bed are important.

From the foregoing it can be seen that methods have been set forth for determining the presence and amount of coal present in earth formations surrounding a borehole so as to enable rapid and easy identification of coal bearing formations. It has furthermore been shown how an analysis of the quality of the coal found in these coal-bearing formations can be computed. Moreover, methods have been disclosed for calculating a strength index representative of the competence of these earth formations. By examination and analysis of the lithology, coal analysis and strength index logs produced in accordance with the present invention, it is possible to determine the ease with which coal can be mined and the desirability of so doing.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A machine method of investigating earth formations adjoining a borehole, comprising:
   a. deriving measurements of the acoustic travel time of a formation over a section of a borehole;
   b. deriving measurements of the bulk density of the formation over the borehole section; and
   c. combining said measurements of travel time $\Delta t$ and bulk volume $\rho_b$ to produce indications of the bulk volume percentages $V_f$, $V_a$, and $V_c$ of fluid, ash and carbon respectively, in accordance with the matrix:

$$\Delta t = \Delta t_f V_f + \Delta t_a V_a + \Delta t_c V_c$$

$$\rho_b = \rho_f V_f + \rho_a V_a + \rho_c V_c$$

$$1 = V_f + V_a + V_c$$

where $\Delta t$ and $\rho_f$, $\Delta t_a$ and $\rho_a$, and $\Delta t_c$ and $\rho_c$ are the characteristic travel times and bulk densities of the fluid, ash and carbon respectively.

2. The method of claim 1 and further including the step of combining said travel time and bulk density measurements to obtain indications of the strength or competence of formations adjoining said borehole section.

3. The method of claim 2 wherein said travel time $\Delta t$ and bulk density $\rho_b$ measurements are combined to produce indications of the dynamic Elastic Modulus of Deformation $E_d$ in accordance with the expression $$E_d = (\rho_b/(\Delta t)^2)K$$

where $K$ is a proportionality constant.

4. A machine method of investigating earth formations adjoining a borehole, comprising:
   a. deriving measurements of the acoustic travel time of a formation over a section of a borehole;
   b. deriving measurements of the bulk density of the formation over the borehole section; and
   c. deriving measurements of the hydrogen content of the formation over the borehole section;
   d. combining said derived measurements to obtain representations of the bulk volume percentage of formation parameters of which at least one is useful in determining the presence of coal deposits in said formation;
   e. monitoring at least one of the bulk volume percentage computations produced by said combining step to detect the presence of an appreciable coal deposit; and
   f. combining said travel time and bulk density measurements upon such an appreciable coal deposit being detected to produce indications of parameters relating to the quality of such a coal deposit.

5. The method of claim 4 wherein the step of combining said travel time and bulk density measurements to produce coal quality indications includes combining said travel time $\Delta t$ and bulk density $\rho_b$ measurements to obtain indications of the volume of fluid $V_f$, carbon $V_c$, and ash $V_a$ in accordance with the matrix:

$$\Delta t = \Delta t_f V_f + \Delta t_a a + \Delta t_c V_c$$

$$\rho_b = \rho_f V_f + \rho_a V_a + \rho_c V_c$$

$$1 = V_f + V_a + V_c$$

where $\Delta t_f$, $\rho_f$ and $\Delta t_a$, $\rho_a$ and $\Delta t_c$, $\rho_c$ are the characteristic travel times and densities of fluid, ash and carbon respectively.

6. The method of claim 5 and further including the step of multiplying the fluid, ash and carbon volume indications by the factors $\rho_f/\rho_b$, $\rho_a/\rho_b$, and $\rho_c/\rho_b$ respectively, to obtain indications of the percent by weight of fluid, ash and carbon respectively.

7. A machine method of investigating earth formations adjoining a borehole, comprising:
   a. deriving measurements of the acoustic travel time $\Delta t$ of a formation over a section of a borehole;
   b. deriving measurements of the bulk density $\rho_b$ of the formation over the borehole section;
   c. deriving measurements of the hydrogen content related porosity $\phi_N$ of a formation over the borehole section;
   d. combining said derived measurements to obtain representations of the amounts of a plurality of formation parameters $P_1$, $P_2$, $P_3$ and $P_4$ in said formation in accordance with the matrix:

$$\Delta t = \Delta t_1 P_1 + \Delta t_2 P_2 + \Delta t_3 P_3 + \Delta t_4 P_4$$

$$\rho_b = \rho_1 P_1 + \rho_2 P_2 + \rho_3 P_3 + \rho_4 P_4$$

$$\phi_N = \phi_{N1} P_1 + \phi_{N2} P_2 + \phi_{N3} P_3 + \phi_{N4} P_4$$

$$1 = P_1 + P_2 + P_3 + P_4$$

where $\Delta t_1, \rho_1, \phi_{N1}$ and $\Delta t_2, \rho_2, \phi_{N2}$ and $\Delta t_3, \rho_3, \phi_{N3}$ and $\Delta t_4, \rho_4, \phi_{N4}$ are the characteristic travel times, densities and hydrogen content related porosities for parameters $P_1, P_2, P_3$ and $P_4$ respectively; and e. combining said travel time and density measurements to obtain representations of the amount of fluid, ash and carbon in a formation in accordance with the matrix:

$$\Delta t = \Delta ct_f V_f + \Delta t_a V_a + \Delta t_c V_c$$

$$\rho_b = \rho_f V_f + \rho_a V_a + \rho_c V_c$$

$$1 = V_f + V_a + V_c$$

where $V_f, \Delta t_f, \rho_f$ and $V_a, \Delta t_a, \rho_a$ and $V_c, \Delta t_c, \rho_c$ are the amounts, characteristic travel times and densities of fluid, ash and carbon respectively.

8. The method of claim 7 and further including the step of combining said travel time and bulk density measurements to obtain the dynamic elastic modulus of deformation in accordance with the relationship $$E_d = (\rho_b/(\Delta t)^2) K$$

where $K$ is a proportionality constant.

9. A machine method of investigating earth formations adjoining a borehole, comprising:
   a. deriving measurements of the acoustic travel time $\Delta t$ of a formation over a section of a borehole;
   b. deriving measurements of the bulk density $\rho_b$ of the formation over the borehole section;
   c. deriving measurements of the hydrogen content related porosity $\phi_N$ of a formation over the borehole section;
   d. combining said derived measurements to obtain representations of the amounts of a plurality of formation parameters $P_1, P_2, P_3$ and $P_4$ in said formation in accordance with the matrix:

$$\Delta t = \Delta t_1 P_1 + \Delta t_2 P_2 + \Delta t_3 P_3 + \Delta t_4 P_4$$

$$\rho_b = \rho_1 P_1 + \rho_2 P_2 + \rho_3 P_3 + \rho_4 P_4$$

$$\phi_N = \phi_{N1} P_1 + \phi_{N2} P_2 + \phi_{N3} P_3 + \phi_{N4} P_4$$

$$1 = P_1 + P_2 + P_3 + P_4$$

where $\Delta t_1, \rho_1, \phi_{N1}$ and $\Delta t_2, \rho_2, \phi_{N2}$ and $\Delta t_3, \rho_3, \phi_{N3}$ and $\Delta t_4, \rho_4, \phi_{N4}$ are the characteristic travel times, densities and hydrogen content related porosities for parameters $P_1, P_2, P_3$ and $P_4$ respectively;

e. monitoring the computation of the amount of at least one of said parameters and producing an output representation if the computation for said at least one monitored parameters exceeds a predetermined value; and
   f. combining said travel time and density measurements if said output representation indicate such an appreciable amount of coal to obtain representations of the amount of liquid, ash and carbon in a formation in accordance with the matrix:

$$\Delta t = \Delta t_f V_f + \Delta t_a V_a + \Delta t_c V_c$$

$$\rho_b = \rho_f V_f + \rho_a V_a + \rho_c V_c$$

$$1 = V_f + V_a + V_c$$

where $V_f, \Delta t_f, \rho_f$ and $V_a, \Delta t_a, \rho_a$ and $V_c, \Delta t_c, \rho_c$ are the amounts, characteristic travel times and densities of fluid, ash and carbon respectively.

* * * * *